United States Patent
Konijn

(10) Patent No.: US 10,486,947 B2
(45) Date of Patent: Nov. 26, 2019

(54) METHOD FOR TRANSFERRING A TOWER CRANE AND A FRAME AND TAKE-UP MECHANISM THEREFOR

(71) Applicant: Liebherr-Werk Biberach GmbH, Biberach an der Riß (DE)

(72) Inventor: Eric Konijn, Rot an der Rot (DE)

(73) Assignee: Liebherr-Werk Biberach GmbH, Biberach an der Riß (DE)

( * ) Notice: Subject to any disclaimer, the term of this patent is extended or adjusted under 35 U.S.C. 154(b) by 195 days.

(21) Appl. No.: 15/525,421

(22) PCT Filed: Nov. 9, 2015

(86) PCT No.: PCT/EP2015/002241
§ 371 (c)(1),
(2) Date: May 9, 2017

(87) PCT Pub. No.: WO2016/074779
PCT Pub. Date: May 19, 2016

(65) Prior Publication Data
US 2018/0282135 A1    Oct. 4, 2018

(30) Foreign Application Priority Data

Nov. 10, 2014 (DE) .................. 10 2014 016 607

(51) Int. Cl.
*B66C 23/36* (2006.01)
*B66C 23/18* (2006.01)
*B66C 23/26* (2006.01)
*F03D 13/10* (2016.01)

(52) U.S. Cl.
CPC ............ *B66C 23/36* (2013.01); *B66C 23/185* (2013.01); *B66C 23/26* (2013.01); *F03D 13/10* (2016.05)

(58) Field of Classification Search
CPC ....... B66C 23/36; B66C 23/26; B66C 23/185; F03D 13/10
See application file for complete search history.

(56) References Cited

U.S. PATENT DOCUMENTS

| 2,627,985 | A | * | 2/1953 | Sathre | ............... | B66C 23/92 |
| | | | | | | 188/317 |
| 3,053,398 | A | * | 9/1962 | Liebherr | ............. | B66C 23/26 |
| | | | | | | 212/176 |
| 3,912,088 | A | * | 10/1975 | Bronfman | ........... | B66C 13/06 |
| | | | | | | 212/260 |
| 3,931,956 | A | * | 1/1976 | Hawkins | ............. | B66C 23/48 |
| | | | | | | 254/8 B |

(Continued)

FOREIGN PATENT DOCUMENTS

DE          27 48 340 A1    5/1978
DE    10 2012 019 248 A1    4/2014

(Continued)

*Primary Examiner* — Michael E Gallion
(74) *Attorney, Agent, or Firm* — Dilworth & Barrese, LLP

(57) ABSTRACT

The present invention relates to a method for transferring a tower crane with a mobile crane, in particular crawler crane, wherein the mounted tower crane is lifted by means of the lifting cable of the mobile crane, in order to transfer the same to the target site, and the tower crane is stabilized by means of one or more connecting points between mobile crane boom and crane tower.

19 Claims, 3 Drawing Sheets

(56) References Cited

U.S. PATENT DOCUMENTS

| | | | | |
|---|---|---|---|---|
| 3,939,988 | A * | 2/1976 | Wellman | B66C 23/34 |
| | | | | 212/297 |
| 4,508,233 | A * | 4/1985 | Helms | B66C 23/48 |
| | | | | 212/199 |
| 5,247,776 | A * | 9/1993 | Tamayo | E21B 15/00 |
| | | | | 52/111 |
| 6,039,194 | A * | 3/2000 | Beeche | B66C 23/20 |
| | | | | 180/411 |
| 7,150,497 | B1 * | 12/2006 | Smith | B66C 13/54 |
| | | | | 296/190.01 |
| 8,684,197 | B2 * | 4/2014 | Pech | B66C 23/348 |
| | | | | 212/260 |
| 9,403,665 | B2 * | 8/2016 | Herse | B66C 23/207 |
| 9,944,502 | B2 * | 4/2018 | Yamashita | B66C 23/365 |
| 10,023,443 | B2 * | 7/2018 | Herse | B66C 23/185 |
| 10,053,340 | B2 * | 8/2018 | Albinger | B66C 23/821 |
| 2010/0072156 | A1 * | 3/2010 | Mentink | B66C 23/365 |
| | | | | 212/196 |
| 2012/0152878 | A1 * | 6/2012 | Ishihara | B66C 23/365 |
| | | | | 212/280 |
| 2018/0282134 | A1 * | 10/2018 | Lagerweij | B66C 23/185 |

FOREIGN PATENT DOCUMENTS

| | | |
|---|---|---|
| DE | 10 2013 011 489 A1 | 1/2015 |
| JP | 2009-247359 A | 10/2009 |

* cited by examiner

METHOD FOR TRANSFERRING A TOWER CRANE AND A FRAME AND TAKE-UP MECHANISM THEREFOR

BACKGROUND OF THE INVENTION

This invention relates to a method for transferring a tower crane.

For the assembly of wind turbines tower cranes are used due to the required large lifting heights. These generally stationary crane towers are transported to the site of use in individual parts and subsequently are mounted for the lifting operation.

Especially during installation of so-called wind farms with a number of wind turbines it is desirable to transport such tower cranes from one site of use to the next site of use as quickly and easily as possible. So far, the cranes are disassembled completely by means of a mobile crane, loaded onto transport vehicles in individual parts, and moved to the next construction site by means of these transport vehicles. At the target site, the tower crane must again be mounted by means of an auxiliary crane and be put into operation. This procedure not only is time-consuming, but also requires a high logistical effort. In general, at least two up to a maximum of five working days are budgeted for transferring the tower crane.

Therefore, there is a demand for an economically more expedient transport method for tower cranes which frequently must be moved between various sites of use. In the past, attempts have been made in which a crawler undercarriage has been mounted under the tower for moving the same. In practice, however, some cranes tipped over while being moved, as the center of gravity of the entire implement is very high and thereby leads to a certain instability during the transport operation. This solution therefore is less suitable in practice.

SUMMARY OF THE INVENTION

The present invention therefore is looking for alternative solutions for the fast transport of a tower crane from one site of use to the next.

This object is solved by the method according to the features herein. Advantageous aspects of the method are subject-matter of the description herein.

According to the invention there is proposed a method for transferring a tower crane by means of a mobile crane. The completely mounted tower crane is lifted by means of the lifting cable of the mobile crane, in order to transfer the same to the target site. In addition, the tower crane is stabilized by means of one or more connecting points between mobile crane boom and crane tower, so that a stable position of the tower crane taken up can be ensured during the entire transport.

As mobile crane, in particular the use of a crawler crane turns out to be advantageous, as crawler cranes are particularly suitable to be moved with a suspended load. The tower crane in particular can be a top-slewing tower crane.

The lifting movement of the tower crane is accomplished via the usual lifting drive of the mobile crane. For this purpose, the lifting cable or the load hook of the mobile crane preferably is attached to one or more fixing points at the tower of the tower crane. It is conceivable that corresponding take-up points are provided at the crane tower, in order to simplify the take-up by the load take-up means of the mobile crane. In particular, it is expedient to bolt a take-up means attached to the load hook of the mobile crane to suitable connecting points of the crane tower, preferably to the lower end of the crane tower.

The manufacture of the connecting points between tower crane and mobile crane boom can be effected before lifting or alternatively after lifting the crane tower to the required lifting height. In the preferred design variant, the connection between crane tower and mobile crane boom is produced before lifting the crane tower. This requires a certain flexibility of the one or more connecting points between the two cranes, in order to enable the succeeding lifting movement. Of course, some of the connecting points can be mounted before lifting, while one or more connecting points are fixed after lifting.

It is preferred particularly when at least one of the connecting points is designed as sliding connecting point, in order to enable a lifting movement of the crane tower, i.e. an axial displacement of the crane tower with respect to the connecting point. In this connection it is conceivable that the connecting point is slidingly arranged on the crane tower along its longitudinal axis. The one or more connecting points between mobile crane boom and tower crane preferably comprise a guide bearing, whereby the mechanical connecting point can slide along the crane tower in longitudinal direction. It likewise is imaginable that only a part of the connecting points is of the sliding type and the remaining part is rigidly connected with the crane structure of the tower crane.

It likewise is conceivable that at least one of the connecting points comprises at least one articulated dumper.

For stabilizing the crane tower it is particularly advantageous when at least one connecting point is provided in the upper region of the crane tower and at least one further connecting point is provided in the lower region of the crane tower. Preferably, a connecting point is created between the region of the tower tip and the boom tip of the mobile crane and a further connecting point between the region of the tower base and the boom foot of the mobile crane.

It is expedient when one or more connecting points are articulated, so that a certain freedom of movement of the tower crane with respect to the mobile crane boom is ensured. The position of the tower crane taken up thereby can be adjusted particularly easily.

The one or more articulated connection points in particular have a horizontal axis of rotation, preferably a horizontal axis of rotation vertical to the luffing plane of the mobile crane. An articulated connection preferably can be provided in the mounting point of the connecting point at the crane tower and/or in the mounting point of the connecting point at the mobile crane boom and/or in the connecting point of possible connecting means.

For forming the one or more connecting points between mobile crane boom and crane tower it can be expedient to previously mount suitable crane components on the mobile crane and/or crane tower. The same for example include one or more connecting frames which are mounted on the tower of the tower crane and serve for the connection with the boom of the mobile crane. It also is conceivable that on the mobile crane boom one or more take-up means are mounted, which include corresponding fastening points for connection of the connecting frame of the crane tower. A preferably articulated connection between mobile crane boom and crane tower thereby can be achieved particularly easily. It also is imaginable that connecting points of variable length can be realized, which provide an additional control or regulation possibility for adjusting the alignment of the crane tower taken up. By varying the length of the connecting point the distance between mobile crane boom and crane tower can be influenced in the region of the connecting point.

Alternatively, take-up means and/or connecting frames can of course also remain firmly mounted on the mobile crane boom and/or crane tower or be firmly integrated into the respective crane structure.

For example, it is conceivable that the position of the longitudinal axis of the tower crane taken up is controlled and/or regulated by an adaptation of the angle of the mobile crane boom, preferably in order to maintain the longitudinal axis of the tower crane taken up in an almost vertical position. Alternatively or in addition to the adaptation of the angle it is possible to exert influence via at least one variable-length connecting point between mobile crane boom and crane tower. A variable-length connecting point in particular is created by means of the preceding assembly of a connecting frame and a take-up means on the mobile crane.

In a particularly preferred embodiment of the method according to the invention the required components, for example in the form of at least one connecting frame as well as a take-up means, are mounted on the crane tower or mobile crane boom and subsequently connected with each other. Subsequently, the lifting cable of the mobile crane is fixed at the corresponding connecting points of the crane tower and the crane tower is slightly lifted, so that the same is balanced completely. Subsequently, the tower base is released from the standing surface of the crane tower, in particular the connection between tower base and foundation is released. Subsequently, the rotary crane can be lifted to the desired lifting height by means of the lifting gear of the mobile crane, in order to be moved to the target site. The almost vertical position of the crane tower is achieved by corresponding adaptation of the luffing angle of the mobile crane and also possibly by a variable-length connecting point.

At the desired target site the tower crane is lowered via the lifting gear of the mobile crane and mounted on the ground of the target site. Subsequently, the connecting points between mobile crane boom and crane tower are released and possible components, for example in the form of the connecting frames, are released from the crane tower.

Beside the method according to the invention, the present invention also relates to a connecting frame to be mounted on a crane tower for carrying out the method according to the invention. It is inventive for the connecting frame that the same almost completely encloses the circumference of the crane tower, in particular completely encloses a lattice piece of the crane tower. Ideally, the frame comprises one or more plain bearings for reducing the friction between frame and crane tower during the vertical lifting movement. It is conceivable that the connecting frame alternatively or in addition comprises one or more articulated dumpers.

In addition, the connecting frame comprises one or more fastening points for connection with a mobile crane boom or possible take-up means of a mobile crane boom. These fastening points in particular are suitable to form one or more articulated connections, in particular with horizontal axis of rotation, preferably transversely to the luffing plane of the mobile crane. Corresponding articulated connections for example are created by a bolt connection between connecting frame and mobile crane boom or receptacle, wherein a pivotal connection is achieved by means of the bolt extending horizontally and transversely to the luffing plane.

Beside the connecting frame the present invention also comprises a take-up means to be mounted on a mobile crane boom for carrying out the method according to the invention, wherein the take-up means in particular is suitable for attachment of a connecting frame.

The take-up means for example can be designed in the form of a swivel arm which is pivotally mountable on the mobile crane boom, in particular on its boom articulation piece. At its end, the swivel arm in addition comprises the possibility for the articulated connection of at least one connecting frame according to the present invention. Both the swivel movement and the articulated attachment of the connecting frame provide for a certain degree of freedom for the movement of the crane tower taken up, in particular a rotation about a horizontal axis of rotation, ideally transversely to the luffing plane, is created.

The swivel arm preferably can be designed variable in length, for example by means of a telescoping mechanism, so that via the swivel mechanism, which for example is controlled hydraulically, an alignment of the crane tower taken up can be achieved during the execution of the method according to the invention.

In addition, the take-up means preferably comprises at least one support cylinder for fixing/adjusting the included swivel angle of the swivel arm with respect to the boom structure of the mobile crane. During assembly on the mobile crane boom, the support cylinder connected with the swivel arm can be connected with the crane structure of the mobile crane boom, in order to cause a swivel movement of the swivel arm due to the piston movement or to maintain the swivel angle.

As an alternative to the configuration of the swivel arm, which preferably is mountable in the region of the boom articulation piece of a mobile crane, the take-up means can be of frame-like design and be rigidly mountable, in particular be boltable, on the boom head of a mobile crane. This form of frame-like take-up means comprises one or more fastening points for the articulated connection of at least one connecting frame of the tower crane according to the present invention.

The present invention also relates to a tower crane with at least one connecting frame according to the present invention and to a mobile crane, in particular crawler crane, with at least one take-up means according to the present invention.

In addition, the invention also comprises a system of at least one tower crane according to the invention and at least one mobile crane according to the invention.

BRIEF DESCRIPTION OF THE DRAWINGS

Further advantages and properties of the invention will be explained in detail in the following part with reference to an exemplary embodiment illustrated in the Figures, in which.

DESCRIPTION OF THE PREFERRED EMBODIMENTS

Figure 1:
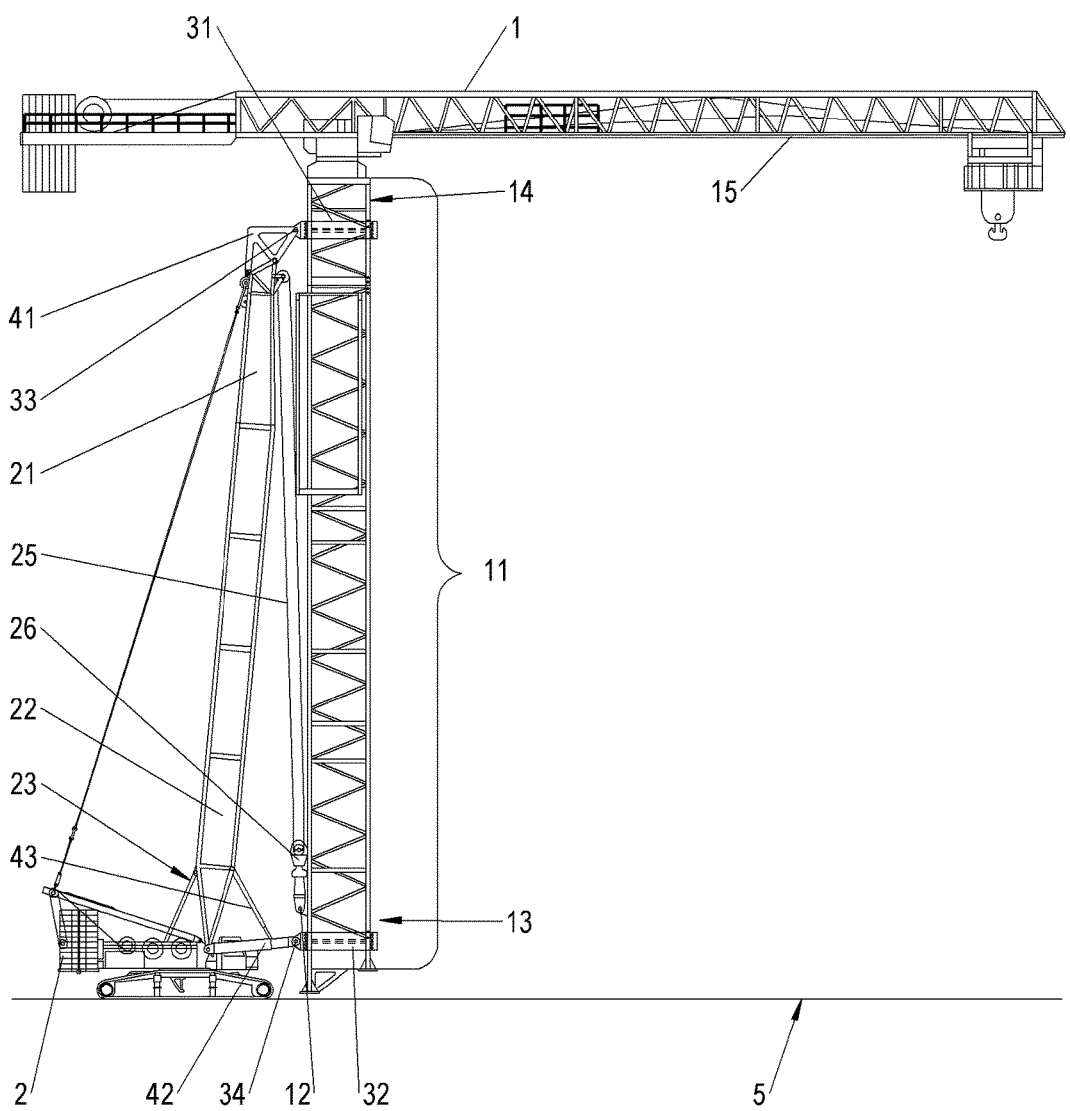
FIG. 1: shows a side view of a mobile crane in the form of a crawler crane with tower crane taken up during the execution of the method according to the invention.

FIG. 1 shows both a crawler crane 2 and a tower crane 1 during the execution of the method according to the invention. The tower crane 1 is configured in a manner known per se and comprises a crane tower 11 composed of individual lattice pieces, on whose tower tip 14 a boom 15 is rotatably mounted via a slewing gear. This tower crane 1 is to be moved from a site of use A to a succeeding site of use B by means of a crawler crane 2, but without demounting the tower crane 1 into its individual parts. For moving the crane it merely is necessary to release the tower base 13 from the ground 5 of the site of use A.

For this purpose, two supported connecting frames 31, 32 are mounted around the crane tower 11 of the tower crane 1, which completely or at least partly enclose the outer circumference of one lattice element each of the crane tower 11. The first connecting frame 31 therefor is fixed at the top of the tower 11 in the region of the tower tip 14. The second connecting frame 32 is mounted on the bottom side of the tower 11, in particular in the region of the tower base 13. For assembly/disassembly it optionally is possible to open the frame structure via a mechanism. Alternatively, however, the connecting frames 31, 32 can also be attached already during assembly of the crane and can remain at the crane structure.

Both the frame 31 and the frame 32 are not rigidly connected with the respective lattice pieces, but rather are slidingly mounted on the outer circumference of the lattice pieces, so that an axial movement of the crane tower 11 through the frame opening is possible. In the drawing, a vertical movement of the crane tower up and down is ensured despite quasi stationary connecting frames 31, 32.

On the boom 22 of the crawler crane 2 two take-up parts 41, 42 are mounted for taking up the tower crane 1. On the boom head piece 21 a frame-like take-up part 41 is mounted, which is articulated to the upper connecting frame 31 via the connecting point 33. The connecting point 33, in particular a bolting point, allows a rotary movement of the connecting frame 31 with respect to the take-up part 41 about a horizontal axis of rotation transversely to the luffing plane of the mobile crane 2.

On the boom articulation piece 23 of the crawler crane a swivel arm 42 is mounted, which on the one hand is pivotally mounted with respect to the articulation piece 23 about a horizontal axis and also permits an articulated connection with the connecting frame 32 in the region of the connecting point 34. The swivel arm 42 also is telescopable in longitudinal direction. By varying the swivel arm length the distance of the tower base 13 to the mobile crane 2 can be determined and hence the alignment of the hanging crane tower 11 can be influenced.

Furthermore, the swivel arm 42 is held via the mounted prop 43 or the swivel angle of the swivel arm 42 with respect to the articulation piece 23 can be adjusted by means of the prop 43. The prop is designed in the form of a hydraulic cylinder which is attached both to the swivel arm and to the mobile crane boom 22.

After the mobile crane boom 22 is connected with the crane tower 11, the lifting cable 25 of the crawler crane 2 or the load hook 26 attached thereto is fixed at the crane tower 11 of the tower crane 1 via one or more fixing points 12. As soon as the tower crane 1 is balanced, the tower crane 1 is slightly lifted by the crawler crane 2 by means of its lifting gear. By means of the lifting gear of the crawler crane 2 the tower crane 1 is brought under pretension without the tower crane 1 being lifted. This results in a stable system and the connection of the crane tower 11 with the ground 5 can safely be released. When the firm connection of the tower crane 1 with the ground 5 is released, the tower crane 1 can be pulled up by means of the lifting gear of the crawler crane 2. Due to the supported connecting frames 31, 32 the tower crane 1 can be pulled up vertically more easily, until the same is lifted off the ground 5 far enough, in order to be moved.

Figure 2:
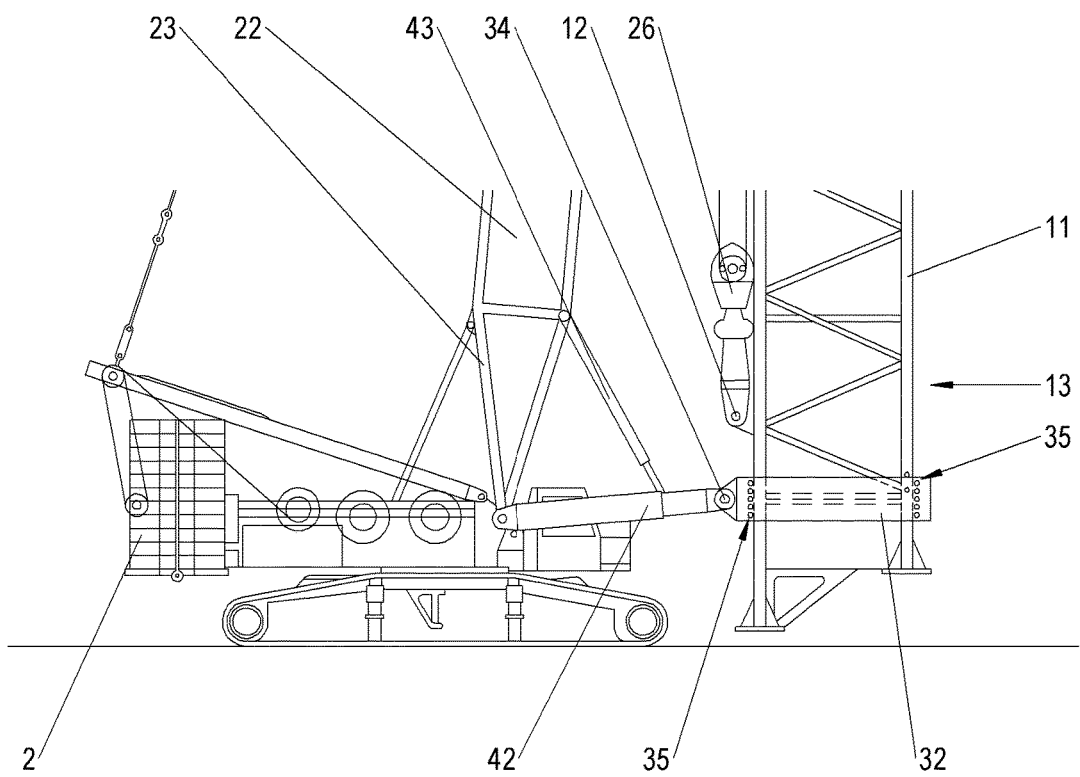
FIG. 2: shows a detail representation of the connecting point between mobile crane and tower crane in the region of the boom foot.
Figure 3:
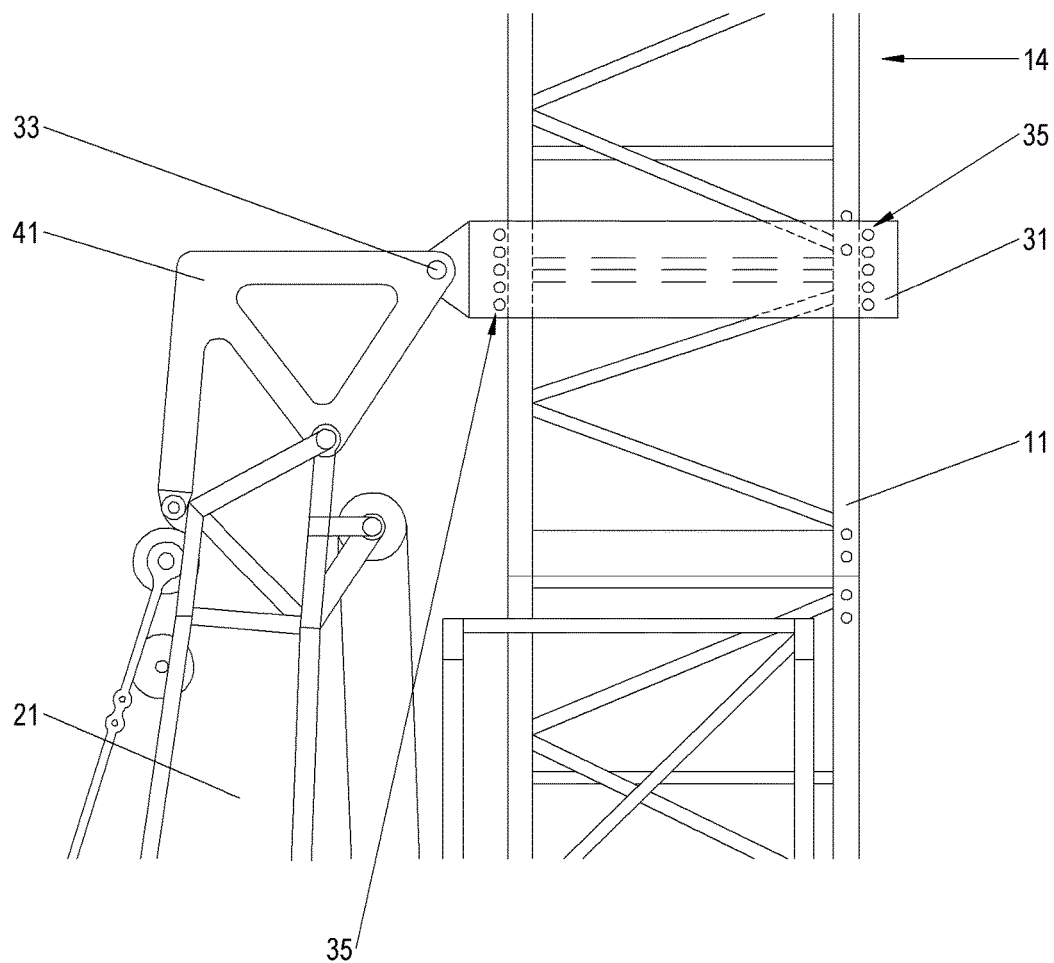
FIG. 3: shows a detail representation of the connecting point between mobile crane and tower crane in the region of the boom head.

As is indicated in particular in the detail representations of FIGS. 2 and 3, one or more plain bearings 35 are provided in the region of the inner frame opening of the connecting frames 31, 32, in order to minimize the frictional force of the sliding movement of the crane tower 11 through the frame opening of the connecting frames 31, 32.

By extending and retracting the swivel arm 42 by means of the telescoping mechanism, the tower crane or its longitudinal axis can be stabilized, in order to maintain the same in an almost vertical position. Beside the telescoping mechanism of the swivel arm 42 the luffing angle of the boom 22 can also be adapted. At the same time, the swivel arm 42 can be adjusted in its height by means of the prop 43.

The take-up part 41 at the crawler crane boom head piece 21 and the uppermost connecting frame 31 at the crane tower 11 can easily be radially rotated with each other, whereby slight irregularities during transfer, such as for example slopes of the travel path, can be overcome. The probable duration of the take-up of the tower crane 1 by the crawler crane 2 including the path-dependent travel can be budgeted with about 1 hour.

As an alternative solution, the lower fixing point 32 at the crane tower 11 also can be designed rigid, other than in the illustrated exemplary embodiment of FIGS. 1 to 3.

Due to the invention as explained above, the previously required long disassembly time is eliminated, which has been required for transferring the tower crane 1. With this solution, the completely mounted tower crane 1 is taken up by means of the crawler crane 2 and, hanging on the crawler crane 2, is transferred from A to B.

The invention claimed is:

1. A method for transferring a tower crane (1) with a mobile crane (2), comprising the steps of
    mounting the tower crane (1) on the mobile crane (2),
    lifting the mounted tower crane (1) by a lifting cable (25) of the mobile crane (2), to transfer the tower crane (1) to a target site, and
    stabilizing the tower crane (1) during transfer the tower crane (1) by coupling a tower (11) of the tower crane (1) to a boom (22) of the mobile crane (2) by two separate connecting frames (31, 32) each circumferentially enclosing the tower (11) at one or more connecting points (33, 34 between the mobile crane boom (22) and the tower (11) of the tower crane (1),
    with at least one of the connecting frames (31, 32) slidingly mounted about the crane tower (11) to allow the crane tower (11) to axially move through an opening of the respective connecting frame (31, 32).

2. The method according to claim 1, wherein during the lifting movement the crane tower is guided in lifting direction by at least one of the one or more connecting points, which comprises a guide bearing.

3. The method according to claim 1, wherein via the connecting points in a region of a tower tip the tower crane is connected with a boom tip of the crawler crane and/or in a region of a tower base is connected with a boom articulation piece of the crawler crane.

4. The method according to claim 1, wherein the one or more connecting points are articulated about a horizontal axis of rotation and the articulated connection is seated at a mounting point of the connecting point with the mobile crane boom (22) and/or at the mounting point with the crane tower (11).

5. The method according to claim 1, wherein the position of a longitudinal axis of the tower crane taken up is controlled/regulated by an adaptation of a luffing angle of the mobile crane boom and/or an adaptation of a distance between the mobile crane boom and the crane tower by at least one variable-length connecting point.

6. A connecting frame element (31, 32) mountable on a crane tower (11), wherein
- the frame element (31, 32) comprises two separate connecting frames (31, 32) each circumferentially enclosing the crane tower (11) when mounted thereon, and
- at least one of the connecting frames (31, 32) is slidingly mountable about the crane tower (11) to allow the crane tower (11) to axially move through an opening of the respective connecting frame (31, 32).

7. The connecting frame according to claim 6, wherein the connecting frame comprises one or more fastening points for connection with the mobile crane boom, forming an articulated connection with the mobile crane boom with a horizontal axis of rotation, which extends transversely to a luffing plane of the mobile crane.

8. A take-up mechanism to be mounted on a mobile crane boom for fastening the connecting frame according to claim 6.

9. The take-up mechanism according to claim 8, comprising a swivel arm which is pivotally mountable on the mobile crane boom and articulatable to at least one said connecting frame.

10. The take-up mechanism according to claim 9, wherein the swivel arm is variable in length.

11. The take-up mechanism according to claim 9, wherein at least one support cylinder is provided for fixing and/or adjusting a swivel angle with respect to the mobile crane boom.

12. The take-up mechanism according to claim 8, which is rigidly mountable on a boom head of the mobile crane boom and comprises one or more connecting points for the articulated connection with the connecting frame.

13. A tower crane with at least one connecting frame according to claim 6.

14. A mobile crane with at least one take-up mechanism according to claim 8.

15. A system comprising at least one tower crane and at least one mobile crane according to claim 14.

16. The method according to claim 3, wherein at least the connecting point in the region of the tower tip comprises a guide bearing.

17. The method according to claim 4, wherein the one or more connecting points are rotatable about the horizontal axis of rotation vertically to a luffing plane of the mobile crane.

18. The method according to claim 5, wherein the position of the longitudinal axis of the tower crane taken up is maintained substantially vertical.

19. The connecting frame according to claim 6, comprising
- two said connecting frames (31, 32) each slidingly mountable about the crane tower (11),
- a take-up part (41) mounted upon a head piece (21) of a boom (22) of a mobile crane (2) and pivotally coupled to one (31) of said connecting frames (31, 32),
- a telescoping swivel arm (42) mounted upon an articulation piece (23) of the crane boom (22) and pivotally coupled to the other connecting frame (32), and
- a prop (43) additionally coupling the swivel arm (42) to the crane boom (22) to adjust swivel angle of the swivel arm (42) with respect to the articulation piece (23).

* * * * *